(12) United States Patent
Morikawa

(10) Patent No.: US 6,761,983 B2
(45) Date of Patent: Jul. 13, 2004

(54) MAGNETIC INFORMATION RECORDING MEDIUM

(75) Inventor: Takeshi Morikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 14 days.

(21) Appl. No.: 10/161,851

(22) Filed: Jun. 4, 2002

(65) Prior Publication Data

US 2002/0187369 A1 Dec. 12, 2002

(30) Foreign Application Priority Data

Jun. 7, 2001 (JP) ........................................ 2001-172988

(51) Int. Cl.$^7$ ............................. G11B 5/82; G11B 5/66
(52) U.S. Cl. ..................... 428/694 TS; 428/694 TM; 428/928; 428/900
(58) Field of Search ................. 428/611, 928, 428/900, 681, 684, 694 R, 694 MT, 694 MM, 694 TS

(56) References Cited

U.S. PATENT DOCUMENTS

| 4,673,612 | A | * | 6/1987 | Takagi et al. ............... 428/216 |
| 4,917,959 | A | * | 4/1990 | Kasanuki .................... 428/458 |
| 5,059,468 | A | * | 10/1991 | Hashimoto et al. .......... 428/141 |
| 5,792,564 | A | * | 8/1998 | Hikosaka et al. ........... 428/610 |
| 5,854,727 | A | * | 12/1998 | Tanaka et al. .............. 360/125 |
| 2002/0048693 | A1 | * | 4/2002 | Tanahashi et al. ..... 428/694 TS |
| 2002/0122958 | A1 | * | 9/2002 | Tanahashi et al. ... 428/694 TM |
| 2003/0059650 | A1 | * | 3/2003 | Nakagawa et al. .. 428/694 TM |

FOREIGN PATENT DOCUMENTS

JP 6-076202 3/1994

OTHER PUBLICATIONS

"Low Coercivity Amorphous Magnetic Alloy Film", IBM Technical Disclosure Bulletin, NN77101970, Oct. 1977, 1 page.*

* cited by examiner

Primary Examiner—John J. Zimmerman
(74) Attorney, Agent, or Firm—Greer, Burns & Crain, Ltd.

(57) ABSTRACT

The magnetic information recording medium includes a backing layer containing Fe and C as its main ingredients, having a substantially amorphous structure, and having an easy axis of magnetization in an in-plane direction, and a magnetic layer having an easy axis of magnetization in a vertical direction and recording information.

4 Claims, 10 Drawing Sheets

FIG. 9

| BACKING LAYER | MEDIUM NOISE Nm ($\mu$ Vrms) | SATURATION MAGNETIZATION Ms (emu/cc) |
|---|---|---|
| Fe20Ni80 | 80 | 1620 |
| CoZrNb | 10 | 930 |
| FeTaC | 30 | 1240 |
| FeC | 5.8 | 1320 |

FIG. 10

| ELECTRIC POWER INPUT (W) | | LAMINATION PERIOD (Å) | | CONTENT (atm%) | | MEDIUM NOISE Nm | SATURATION MAGNETIZATION Ms |
|---|---|---|---|---|---|---|---|
| Fe (Pwf) | C (Pwc) | Fe | C | Fe | C | (µVrms) | (emu/cc) |
| 800 | 200 | 2.97 | 0.10 | 99.26 | 0.74 | 133.7 | 1720 |
| 800 | 600 | 2.97 | 0.32 | 88.83 | 11.17 | 115.8 | 1600 |
| 800 | 800 | 2.97 | 0.43 | 76.99 | 23.01 | 9.1 | 1480 |
| 800 | 1000 | 2.97 | 0.53 | 64.02 | 35.98 | 6.4 | 1360 |
| 800 | 1200 | 2.97 | 0.64 | 56.32 | 43.68 | 5.8 | 1260 |
| 800 | 1400 | 2.97 | 0.75 | 45.13 | 54.87 | 4.32 | 780 |
| 800 | 1600 | 2.97 | 0.84 | 32.42 | 67.58 | 2.65 | 320 |

MAGNETIC INFORMATION RECORDING MEDIUM

CROSS-REFERENCE TO RELATED APPLICATION

This application is related to Japanese Patent Application No. 2001-172988 filed in Jun. 7, 2001, whose priority is claimed under 35 USC §119, the disclosure of which is incorporated by reference in its entirety.

BACKGROUND OF THE INVENTION

1. Field of the Invention

The present invention relates to a magnetic information recording medium, and particularly to a vertical magnetic-recording magnetic information recording medium including a backing layer made of a soft magnetic film.

2. Description of the Related Art

Conventionally, a hard disk is used as a magnetic information recording medium. The hard disk is such that a magnetic layer made of CoCr alloy or the like is laminated on a disk-like nonmagnetic substrate of glass or the like.

A hard disk device is such that recording and reproduction of data is carried out by rotating the hard disk at high speed and causing a magnetic head for recording and reproduction to approach this hard disk.

A conventional hard disk uses an in-plane magnetic recording system in which anisotropy is provided in an in-plane direction of the disk, and at present, the disk having a capacity of about 20 Gbit/inch$^2$ is realized by this system.

Besides, in recent years, in order to deal with a request for higher density, a vertical magnetic-recording is proposed in which track recording density (density in a track direction) of the disk is raised.

In the vertical magnetic-recording hard disk, information is recorded in a magnetic film (for example, TbFeCo) having perpendicular magnetic anisotropy. Besides, in the vertical magnetic-recording, there is proposed a hard disk in which in order to record and reproduce information in this magnetic film at high density and high efficiency, a soft magnetic film as a backing layer is provided between a substrate and a magnetic film (Japanese Unexamined Patent Publication No. Hei 6 (1994)-76202).

The backing layer is formed as a film having in-plane magnetic anisotropy, and this layer is such that a high magnetic field is obtained by magnetic interaction generated between a magnetic head and the backing layer to efficiently carry out vertical magnetic recording in the magnetic film. Here, from a viewpoint of recording and reproduction efficiency, a magnetic material having low coercive force is used for the backing layer.

For example, an FeNi alloy film (FeNi), a CoZr alloy film (CoZrNb), an inter-metallic compound film (FeTaC) or the like is used as the backing layer.

The formation of the backing layer on the substrate is carried out in such a manner that an alloy target of FeNi or the like or an inter-metallic compound target of FeTaC or the like is used, an external magnetic field of about 100 oersted (Oe) is applied, and sputtering onto the substrate is performed in a high temperature state of about 250° C.

However, the conventionally used backing layer has problems that a medium noise is produced in a low frequency region, saturation magnetization is low, and formation of the in-plane magnetic anisotropy is difficult, and particularly in the point of high reliability of signal quality of recording and reproduction, it does not reach a practical level.

For example, in the case where FeNi alloy is used for the backing layer, since the saturation magnetization Ms is about 1500 emu/cc and is sufficiently high, there is no problem in the recording efficiency. However, in order to form the in-plane magnetic anisotropy necessary for recording and reproduction, as set forth before, it is necessary to form this backing layer by applying the external magnetic field and in the heating state of about 250° C., and the adjustment of this temperature and the magnetic field is not easy. Besides, since a magnetic domain size is large, a large medium noise (about 80 μVrms) in a low frequency region is produced.

In the case where CoZr alloy is used for the backing layer, in-plane magnetic anisotropy excellent for recording and reproduction can be formed. However, since the saturation magnetization Ms is as low as about 900 emu/cc, there is a problem in recording efficiency. Besides, a medium noise of about 10 μVrms in a low frequency region is also produced, and practically sufficient reliability can not be obtained.

Further, in the case where FeTaC is used for the backing layer, in order to form in-plane magnetic anisotropy necessary for recording and reproduction, it is necessary to carry out the formation by applying an external magnetic field and in a heated state of about 350° C. The saturation magnetization Ms is about 1100 emu/cc and is small as compared with FeNi alloy, and accordingly, there is a problem in recording efficiency. Besides, a medium noise of about 30 μVrms in a low frequency region is also produced, and practically sufficient reliability can not be obtained.

Accordingly, in the backing layer made of the conventionally used material, it is difficult to suppress the medium noise in the low frequency region while a large saturation magnetization required in practical use is provided, and it is difficult to secure reliability of recording and reproduction to such a degree that a practical problem does not occur.

Further, in FeNi alloy or the like, in order to form in-plane magnetic anisotropy sufficient for recording and reproduction at the time of formation of the backing layer, it is necessary to carry out sputtering of the alloy material under the conditions of application of the external magnetic field and the high temperature.

SUMMARY OF THE INVENTION

The present invention is a magnetic information recording medium which is provided with a backing layer made of a soft magnetic film of a substantially amorphous structure and has a high saturation magnetization Ms and a low medium noise in a low frequency region.

Besides, the object of the invention is to form a backing layer having a practical in-plane magnetic anisotropy without applying an external magnetic field and under a room temperature environment.

This invention provides a magnetic information recording medium comprising a backing layer containing Fe and C as its main ingredient, having a substantially amorphous structure, and having an easy axis of magnetization in an in-plane direction, and a magnetic layer having an easy axis of magnetization in a vertical direction and recording information.

BRIEF DESCRIPTION OF THE DRAWINGS

FIG. 9 shows measurement results of the saturation magnetization and medium noise of magnetic information recording media.

FIG. 10 shows measurement results of content, saturation magnetization, and medium noise in the case where electric power input of a C target is changed in an example of the invention.

DETAILED DESCRIPTION OF THE PREFERRED EMBODIMENTS

Figure 1:
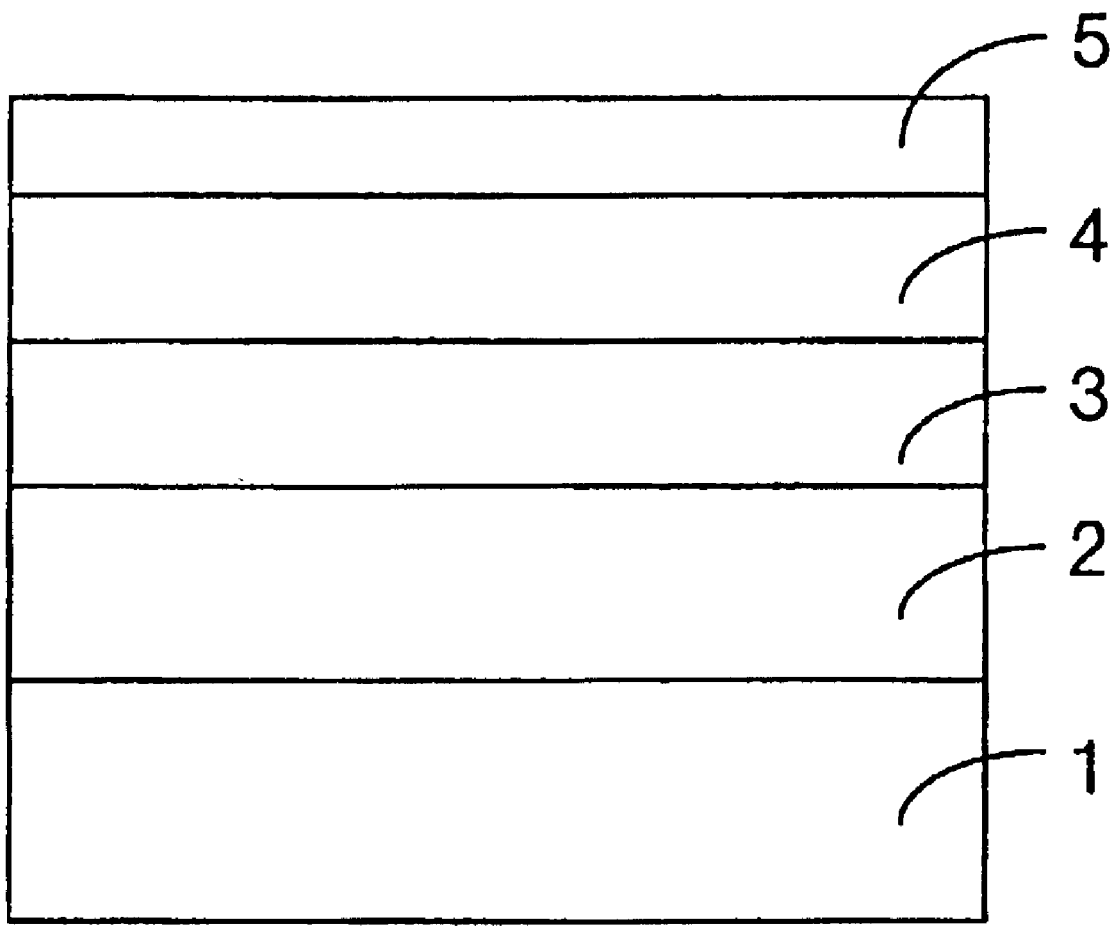
FIG. 1 is a structural sectional view of a magnetic information recording medium of an embodiment of the invention.

This invention provides a magnetic information recording medium comprising a backing layer containing Fe and C as its main ingredient, having a substantially amorphous structure, and having an easy axis of magnetization in an in-plane direction, and a magnetic layer having an easy axis of magnetization in a vertical direction and recording information.

In view of reduction of a medium noise, it is preferable that the magnetic information recording medium of the invention is provided with a nonmagnetic intermediate layer between the backing layer and the magnetic layer.

Here, it is preferable that a value of the saturation magnetization of the backing layer is 1200 emu/cc or higher, and an anisotropy magnetic field is higher than 15 Oe.

The substantially amorphous structure is a structure including a microcrystalline state in addition to the so-called amorphousness.

In this invention, the microcrystal is such that although a clear peak is not shown by X-ray diffraction, a halo pattern and a spot pattern are shown by an electron microscope. The amorphous structure is such that a clear peak is not shown by X-ray diffraction, and only a halo pattern is shown by an electron microscope.

According to this invention, it is possible to provide a magnetic information recording medium in which the medium noise is low and the magnetic anisotropy in the in-plane direction is high, while a high saturation magnetization is kept.

Especially, in order to provide an excellent magnetic property, it is preferable that an Fe content ratio of the backing layer is 90 at % or less and 50 at % or higher.

Besides, this invention provides a method of forming a magnetic information recording medium in which a backing layer and a magnetic layer are formed on a substrate in this order, and the method is characterized in that the backing layer is formed by using an Fe target and a C target, and by carrying out cosputtering at room temperature, in a state where an external magnetic field is not applied, and in an atmosphere of a predetermined sputtering gas.

According to this invention, when the backing layer is formed on the substrate, since heating and application of the external magnetic field are not carried out, there are effects that the formation of the backing layer can be carried out more easily than the related art, the production efficiency is high, and the controllability is also excellent.

In the magnetic information recording medium of the invention, it is sufficient if the backing layer is provided on the substrate of glass, silicon, or aluminum, and the magnetic layer is provided above the backing layer, and the nonmagnetic intermediate layer may not be provided. Besides, in order to prevent damage of the magnetic layer, it is preferable to provide a protective layer made of carbon or the like as the uppermost layer.

The magnetic layer is mainly formed of a so-called vertical magnetic recording film having an easy axis of magnetization in the vertical direction with respect to the substrate.

The vertical magnetic recording film can be formed of a magnetic material such as TbFeCo, Pd/Co multilayer film, or CoCrPt alloy.

The magnetic layer may be formed of a multilayer film by laminating a plurality of vertical magnetic recording films, in addition to the vertical magnetic recording film of a single layer.

In this invention, the backing layer made of an FeC film is formed by cosputtering using the Fe target and the C target, and the FeC film after the formation is made to have a microcrystalline or amorphous structure. In order to make the backing layer have such structure, it is preferable to adjust the rotational speed of the substrate, electric power input to the targets, and sputtering gas pressure so that an Fe layer of 0.1 Å or higher and 10 Å or lower, and a C layer of 0.1 Å or higher and 1 Å or lower are laminated during one rotation of the substrate.

Hereinafter, the invention will be described in detail on the basis of an embodiment shown in the drawings. However, the invention is not limited to this.

[1] Outline of Structure

FIG. 1 is a schematic sectional view of a magnetic information recording medium of an embodiment of the invention.

The magnetic information recording medium of the invention shown in FIG. 1 includes a backing layer 2, a nonmagnetic intermediate layer 3, a magnetic layer 4, and a protective layer 5 formed in this order on a substrate 1.

Here, since the nonmagnetic intermediate layer 3 does not relate to enlargement of the saturation magnetization and the in-plane magnetic anisotropy of the backing layer 2, it may not be formed. However, it is preferable to form the layer at this position in view of reduction of the medium noise.

In FIG. 1, the substrate 1 is formed of a material such as glass, silicon, or aluminum, and is a disk-like thin plate having a thickness of about 0.6 to 0.8 mm. The backing layer 2 having a thickness of about 200 nm is formed on the substrate 1, and in this invention, an FeC film of a soft magnetic film is used as the backing layer 2. However, another soft magnetic film having at least a microcrystalline or amorphous structure, and having an easy axis of magnetization in an in-plane direction may be used.

In this invention, since the "FeC film having the microcrystalline or amorphous structure", which has not been conventionally used as the backing layer, is used as the backing layer, as described later, a magnetic information recording medium having both properties of a high saturation magnetization and a low medium noise in a low frequency region, which were not conventionally realized, can be realized.

Besides, the formation of this FeC film can be carried out, as described later, at room temperature and without applying an external magnetic field, by a so-called cosputtering method, and even under such conditions, the backing layer 2 having a practically sufficient in-plane magnetic anisotropy can be formed.

The nonmagnetic intermediate layer 3 is formed on the medium structure including the backing layer 2 by sputtering, and is formed of, for example, an NiP film having a thickness of about 60 nm. As the nonmagnetic intermediate layer 3, $SiO_2$, SiN or the like may be used in addition to the NiP film.

The magnetic layer 4 is a layer formed on the nonmagnetic intermediate layer 3 and having a thickness of about 10 to 40 nm, and is formed by sputtering a magnetic material having a perpendicular magnetic anisotropy.

Besides, although the magnetic layer 4 may be formed of a magnetic film of a single layer, it may be formed of a multilayer magnetic film of two or more layers. For example, TbFeCo as a material having a perpendicular magnetic anisotropy is laminated while a composition ratio is changed.

The protective layer 5 is a layer formed on the magnetic layer 4 and having a thickness of about 15 nm, in order to prevent physical deterioration of the magnetic film, and for example, it is formed by sputtering carbon C. As the protective layer 5, $SiO_2$, SiN or the like can be used in addition to carbon.

The magnetic information recording medium of the invention has the layer structure as described above, and it is necessary that at least a high saturation magnetization Ms and a low medium noise can be realized. However, the invention is not limited to this layer structure, and other layers may be added in accordance with requested performance. Especially from the viewpoint of the high saturation magnetization Ms and the low medium noise, it is sufficient if at least the backing layer 2 made of the FeC film of the microcrystalline or amorphous structure, and the magnetic layer 4 having the perpendicular magnetic anisotropy are provided.

Besides, from the viewpoint of high resolution, an intermediate layer of carbon C may be formed between the nonmagnetic intermediate layer 3 and the magnetic layer 4. Further, the backing layer 2, the nonmagnetic intermediate layer 3, the magnetic layer 4, and the protective layer 5 formed on the substrate can be respectively formed in an Ar gas atmosphere by sputtering with targets of predetermined materials.

[2] Structure of the Backing Layer

Next, the backing layer, which is the most characteristic layer in the magnetic information recording medium of the invention, will be described.

With respect to the backing layer 2, at the time of film formation by the cosputtering method, although an Fe film layer and a C film layer are alternately laminated, after completion of the formation, Fe and C are mixed and the FeC film of a single layer is formed.

A self-revolving type sputtering apparatus of a type in which the substrate 1 is rotated, or a rotation cathode type sputtering apparatus of a type in which a target of a sputtering material is moved is used for the formation of the backing layer 2. Besides, an Fe target and a C target are separately used as targets.

The cosputtering of the FeC film is carried out without applying an external magnetic field, at room temperature, and in an Ar gas atmosphere.

In the case where the self-revolving type sputtering apparatus is used, in a period in which the substrate 1 makes one rotation in the vicinity of the target, that is, in one lamination period, for example, an Fe film of about 3 Å and a C film of about 0.5 Å are alternately laminated, and until the thickness finally becomes about 200 nm, this lamination is carried out.

Here, the lamination amounts of Fe and C per lamination period are not limited to the above values, and the lamination period may be selected so that the microcrystalline or amorphous structure is formed in the FeC film.

The reason why the FeC film is formed to have the microcrystalline or amorphous structure is that it is easy to form an in-plane magnetic anisotropy having a difficult axis of magnetization in the circumferential direction of a disk-like medium, and having an easy axis of magnetization in the radial direction.

In order to form the FeC film having the microcrystalline or amorphous structure, it is necessary to suitably select the lamination period of Fe and C and the Fe content (content) in the FeC film. Specifically, the rotating speed of the substrate and the electric power input of Fe and C are suitably adjusted.

FIGS. 2, 3, 4 and 5 are graphs of X-ray diffraction patterns of FeC layers formed when the electric power input Pwf of the Fe target is made a constant value of 800 W, and the electric power input Pwc of the C target is changed to 200 W, 400 W, 800 W and 1000 W. Here, the number of revolutions of the substrate is made 70 times/minute. The horizontal axis of each of these graphs indicates the diffraction angle (deg), and the vertical axis indicates the diffraction peak intensity.

Figure 2:
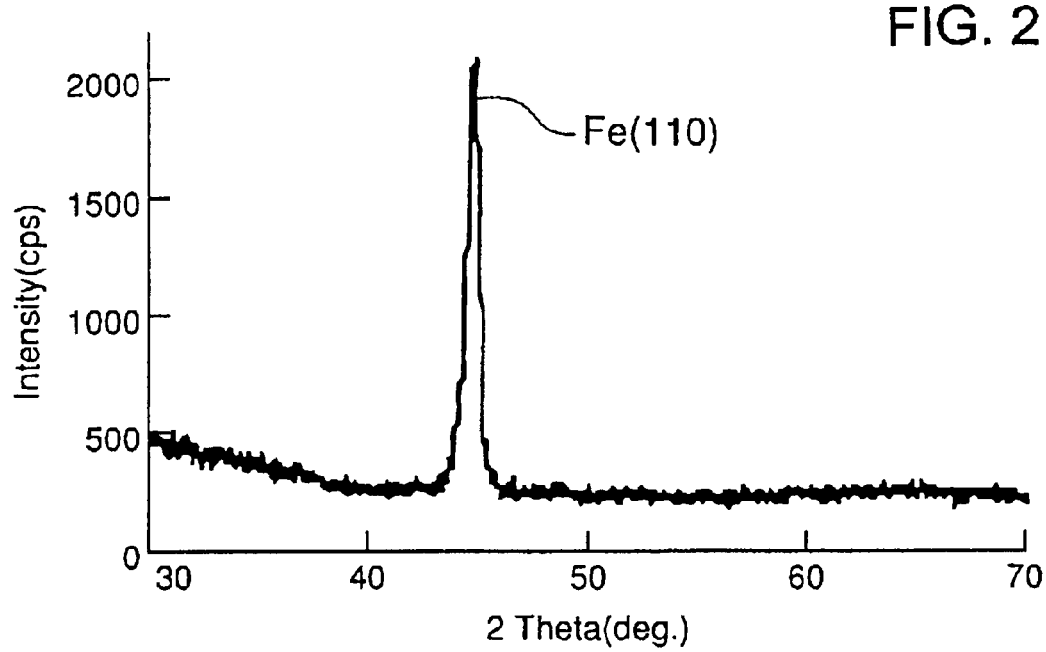
FIG. 2 is an X-ray diffraction pattern (Fe: 800 W, C: 200 W) of a magnetic information recording medium of the invention.

According to the graph of FIG. 2 (Fe electric power input Pwf=800 W, C electric power input Pwc=200 W), the diffraction peak of Fe (110) is sharply detected, and it is understood that a crystalline structure of Fe is formed. That is, in this case, it can be said that the FeC film does not have the microcrystalline and amorphous structure.

Figure 3:
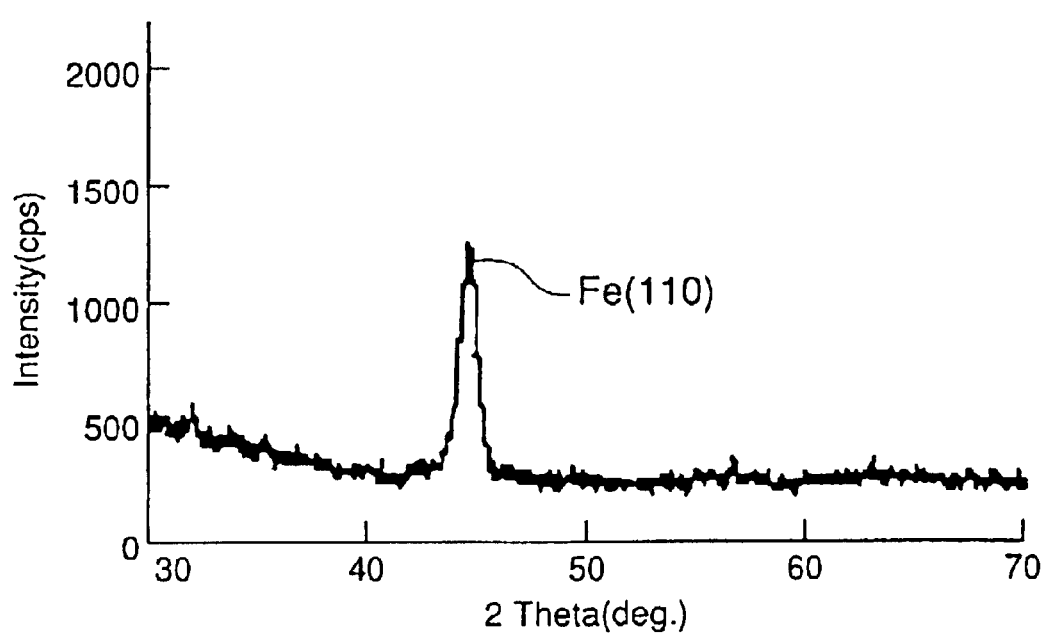
FIG. 3 is an X-ray diffraction pattern (Fe: 800 W, C: 400 W) of a magnetic information recording medium of the invention.
Figure 4:
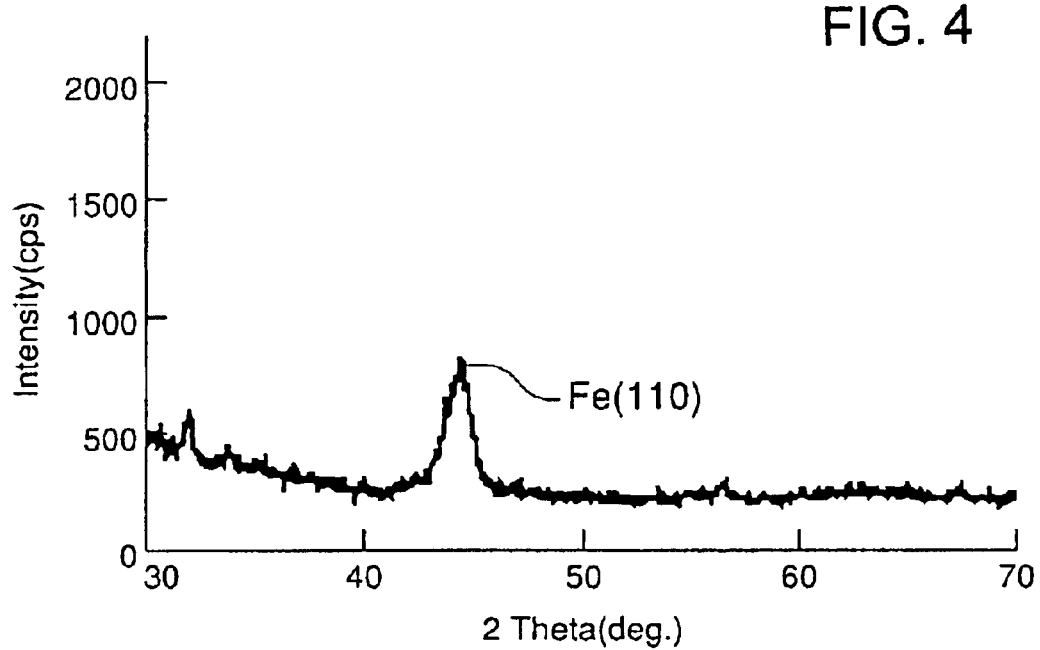
FIG. 4 is an X-ray diffraction pattern (Fe: 800 W, C: 800 W) of a magnetic information recording medium of the invention.

Similarly, also in the graph of FIG. 3 (Fe electric power input Pwf=800 W, C electric power input Pwc=400 W) and the graph of FIG. 4 (Fe electric power input Pwf=800 W, C electric power input Pwc=800 W), since the diffraction peak of Fe (110) is detected, the microcrystalline or amorphous structure is not formed.

Figure 5:
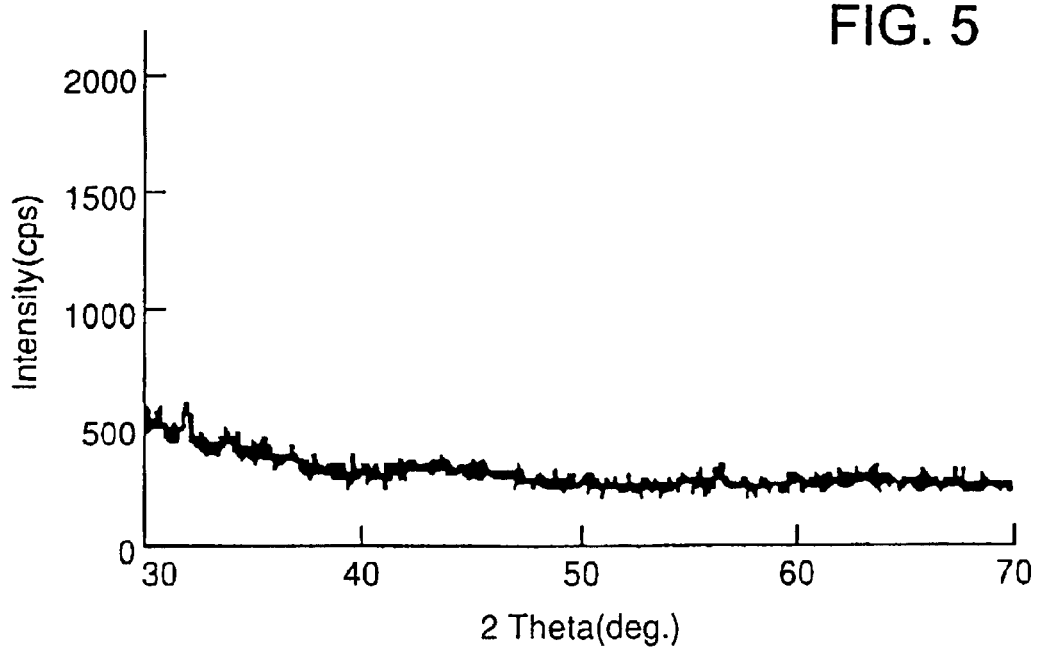
FIG. 5 is an X-ray diffraction pattern (Fe: 800 W, C: 1000 W) of a magnetic information recording medium of the invention.

On the other hand, in the graph of FIG. 5 (Fe electric power input Pwf=800 W, C electric power input Pwc=1000 W), since the diffraction peak of Fe (110) is not detected, in this case, it is conceivable that the FeC film has the microcrystalline or amorphous structure.

In the case of FIG. 5, the lamination amount of Fe per period was made 2.97 Å, and the lamination amount of C was made 0.53 Å, and after the formation of the FeC film, the content of Fe was 64 at %, and the content of C was 36 at %.

In the case of FIG. 5, when the magnetic property was measured by a vibrating sample magnetometer or a B-H loop tracer, an excellent anisotropic magnetic field of about 30 Oe was obtained, and a high saturation magnetization Ms of about 136 Oemu/cc was obtained.

Further, while a high medium noise of 80 $\mu$Vrms was produced in the conventional FeNi alloy, the medium noise was reduced to about 6 $\mu$Vrms in the case of FIG. 5.

Accordingly, it is understood that when the content of Fe in the FeC film is adjusted so that the FeC film has the microcrystalline or amorphous structure, the backing layer having properties of a high saturation magnetization Ms and a low medium noise can be formed.

Next, a description will be given as to what degree of Fe content is preferable in the FeC film.

Figure 6:
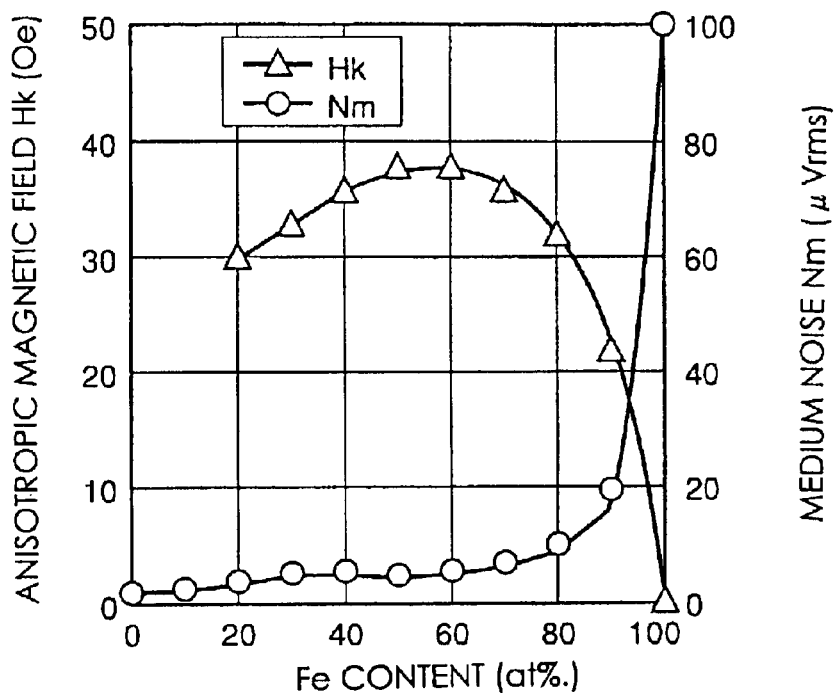
FIG. 6 is a graph of an anisotropic magnetic field Hk and a medium noise Mn with respect to the change of Fe content of a magnetic information recording medium of the invention.

FIG. 6 is a graph of an anisotropic magnetic field Hk (Oe) and a medium noise Nm ($\mu$Vrms) with respect to an Fe content of the FeC film.

According to FIG. 6, as the Fe content becomes low, the anisotropic magnetic field Hk of the FeC film becomes high, and when the Fe content is about 50 at %, the maximum value (38 Oe) is indicated. Besides, the medium noise Nm is 20 $\mu$Vrms when the Fe content is about 90 at %, and 10 $\mu$Vrms when the Fe content is about 80 at % or less, and it is understood that as the Fe content becomes low, the medium noise becomes low.

That is, from the graph of FIG. 6, it is understood that when the Fe content is 90 at % or less, the anisotropic magnetic field Hk excellent in practical recording and reproduction is obtained, and the medium noise Nm can be suppressed.

Figure 7:
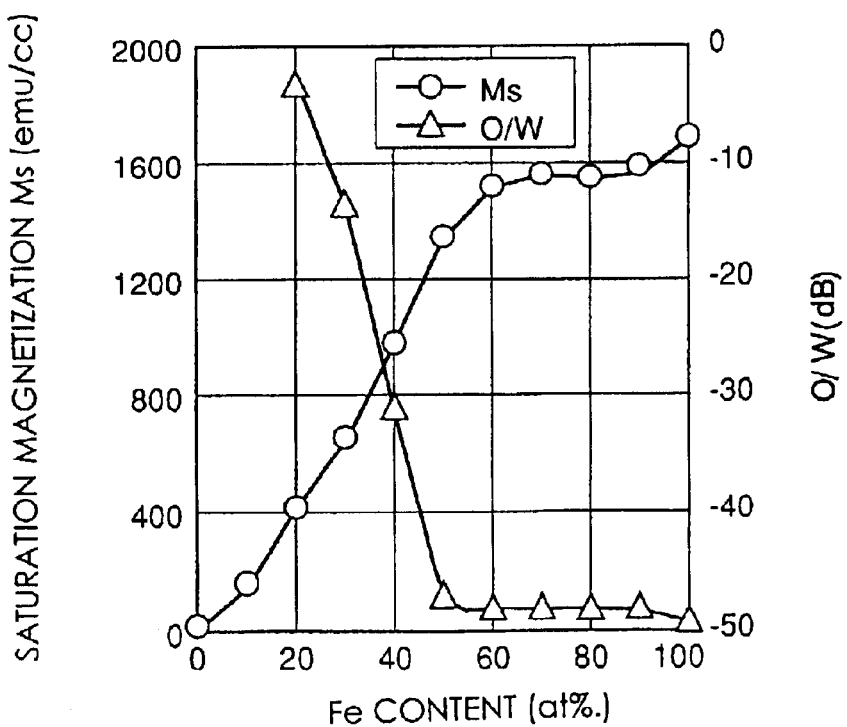
FIG. 7 is a graph of a saturation magnetization Ms and an overwrite property O/W with respect to the change of Fe content of a magnetic information recording medium of the invention.

FIG. 7 is a graph of a saturation magnetization Ms (emu/cc) and an overwrite (O/W) property with respect to an Fe content of the FeC film.

Here, the saturation magnetization Ms is as high as 1300 emu/cc when the Fe content is 50 at % or higher, and is almost constant (1500 emu/cc) when the Fe content is 60 at % or higher, whereas when the Fe content is decreased to 40 at % or less, the saturation magnetization Ms also becomes a value of 1000 emu/cc or less.

The overwrite O/W property indicates the erased ratio (dB) of a signal of 50 kfci in the case where a signal of 400 kfci is recorded on a signal of 50 kfci, and it can be said that as this value becomes low, the property becomes good.

According to FIG. 7, it is understood that when the Fe content is 50 at % or higher, the overwrite O/W property indicates a low value of −50 dB and is excellent, however, when the Fe content is 50 at % or less, the overwrite O/W property rapidly deteriorates.

It is conceivable that the deterioration of the O/W property is due to the decrease of the saturation magnetization Ms.

From the graph of FIG. 7, it is understood that in order to secure the overwrite O/W property of, for example, −30 dB or less, the saturation magnetization Ms of the FeC film should be at least about 1000 emu/cc.

Accordingly, from the graphs of FIG. 6 and FIG. 7, in the case where the FeC film is used as the soft magnetic film for the backing layer of the vertical magnetic recording medium, in order to obtain a high saturation magnetization Ms, low medium noise Nm, and high anisotropic magnetic field which are desirable for recording and reproduction of information, it can be said that the content of Fe is made a value within the range from 50 at % to 90 at %.

[3] Example (Structure and Formation Process)

Next, a specific structure and formation method of an example of a magnetic information recording medium of the invention will be described.

Figure 8:
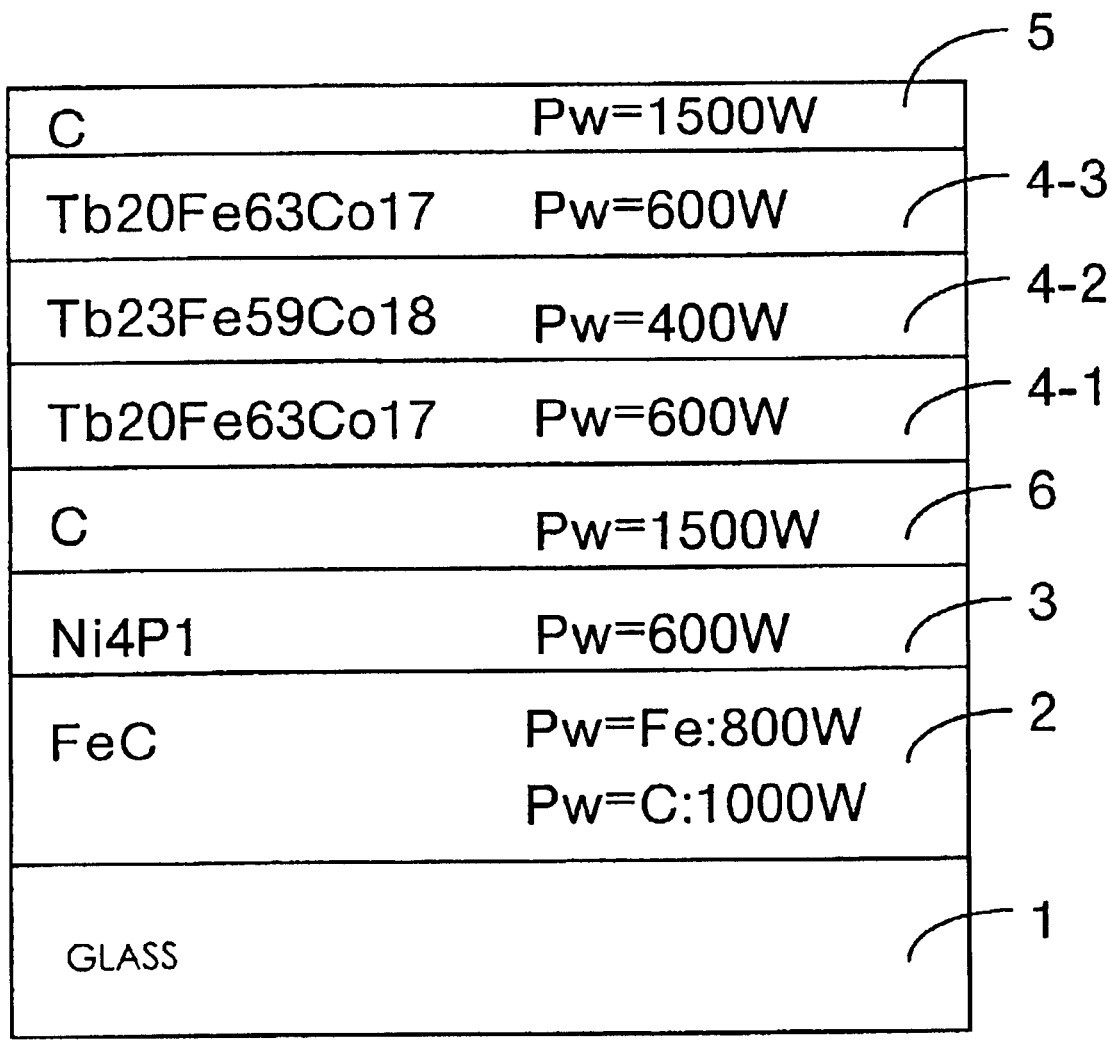
FIG. 8 is a structural sectional view of an example of a magnetic information recording medium of the invention.

FIG. 8 is a structural sectional view of an example of the magnetic information recording medium of the invention.

In this example, a backing layer 2 (FeC film), a nonmagnetic intermediate layer 3 (NiP film), a nonmagnetic intermediate layer 6 (C film), magnetic layers 4-1, 4-2, and 4-3 (TbFeCo film), and a protective layer 5 were formed in this order on a glass substrate 1.

Here, the magnetic layers were formed of three layers having different compositions.

Tb20Fe63Co17 was used for the lower magnetic layer 4-1, Tb23Fe59Co18 was used for the center magnetic layer 4-2, and Tb20Fe63Co17 was used for the upper magnetic layer 4-3.

With respect to the film thicknesses of the respective layers, the FeC film 2 has 200 nm, the NiP film 3 has 60 nm, the C film 6 has 2 nm, the TbFeCo film 4-1 has 5 nm, the TbFeCo film 4-2 has 13 nm, the TbFeCo film 4-3 has 5 nm, and the C film 5 for the protective layer has 15 nm.

The formation process of the respective layers was carried out such that a target for formation of each layer was prepared at a predetermined position of a self-revolving type sputtering apparatus, and sputtering of each material was carried out sequentially from the lower layer on the substrate 1, at room temperature (30° C.) and in an atmosphere of Ar gas. An external magnetic field was not applied.

First, in order to form the FeC film as the backing layer 2, an Fe target and a C target are mounted in the self-revolving type sputtering apparatus, and the substrate 1 is put on a rotation table.

The sputtering was carried out by the so-called cosputtering method under the conditions of sputtering rate=40 nm/min, sputtering gas Ar pressure=0.5 Pa, electric power input: Fe=800 W, C=1000 W, and rotational speed: 70 times/minute.

By this sputtering, each time the substrate makes one rotation, an Fe layer of about 2.97 Å and a C layer of about 0.53 Å are alternately laminated, and when the FeC film having a film thickness of about 200 nm is formed, the film comes to have a state where Fe and C are mixed. At this time, the Fe content of the FeC film was 64.02 at %, and the C content was 35.98 at %. Also in this case, as described before, according to the measurement of X-ray diffraction, the FeC film had the microcrystalline or amorphous structure.

Next, the NiP film 3 is formed on the FeC film 2. Here, Ni4P1 was used as a target, and sputtering was carried out under the conditions of sputtering rate=30 nm/min, sputtering gas Ar pressure=1.0 Pa, and electric power input=600 W.

Next, the C film 6 is formed on the NiP film 3. Here, C was used as a target, and sputtering was carried out under the conditions of sputtering rate=20 nm/min, sputtering gas Ar pressure=0.5 Pa, and electric power input=1500 W.

Next, the three magnetic layers are formed.

Among the magnetic layers, in order to form the lower layer 4-1, Tb20Fe63Co17 was used for a target, and sputtering was carried out under the conditions of sputtering rate=20 nm/min, sputtering gas Ar pressure=0.5 Pa, and electric power input=600 W.

In order to form the center magnetic layer 4-2, Tb23Fe59Co18 was used for a target, and sputtering was carried out under the conditions of sputtering rate=15 nm/min, sputtering gas Ar pressure=1.0 Pa, and electric power input=400 W.

The formation of the upper layer 4-3 of the magnetic layers was carried out under the same conditions as those of the lower layer 4-1 (target: Tb20Fe63Co17, sputtering rate=20 nm/min, sputtering gas Ar pressure=0.5 Pa, and electric power input=600 W).

Finally, the C film 5 as the protective layer is formed on the magnetic layer 4-3 of the upper layer. Carbon C was used as a target, and sputtering was carried out under the conditions of sputtering rate=56 nm/min, sputtering gas Ar pressure=0.5 Pa, and electric power input=1500 W.

FIG. 9 shows results of measurement of the saturation magnetization Ms and the medium noise Nm with respect to the magnetic information recording medium of FIG. 8 formed in this way.

Here, a lead core width of a magnetic head was made 0.8 $\mu$m, and a lead gap layer was made 0.15 $\mu$m. Besides, FIG. 9 also shows the saturation magnetization Ms and the medium noise Nm of the magnetic information recording media using the conventional backing layers, which are measured under the same conditions. The film thickness of every film is 200 nm.

According to FIG. 9, in the case where the FeC film of the invention is used as the backing layer 2, the saturation magnetization Ms is about 1320 (emu/cc), and is larger than that in the case where FeTaC is used. Although the saturation magnetization is smaller than that in the case where FeNi is used, it is understood that a sufficiently high Ms for the function of the backing layer is kept. Besides, with respect to the medium noise Nm, in the case where the FeC film of the invention is used, it becomes 5.8 $\mu$Vrms, and it is understood that the medium noise is considerably suppressed as compared with other conventional ones.

That is, in the case where the FeC film of the invention is used as the backing layer 2, it can be said that while the high saturation magnetization comparable to the related art is kept, the low medium noise can be realized.

Besides, as mentioned before, the formation process of the magnetic information recording medium is different from that of the related art, and the process is carried out at room temperature and without applying an external magnetic field.

Accordingly, although it is necessary to control the electric power input to the target, the rotational speed of the substrate, the sputtering gas pressure and the like, since it is not necessary to consider the temperature condition and the condition of the external magnetic field among the formation conditions, the formation of each layer constituting the medium is easier than the related art.

Although the formation of each layer of the medium is carried out using the self-revolving type sputtering apparatus, similarly, it may be carried out using a rotation cathode type sputtering apparatus in which a target itself rotates in the vicinity of the substrate. Also in the case where the rotation cathode type sputtering apparatus was used, when the FeC was used for the backing layer, it was possible to form a medium having an excellent saturation magnetization Ms and a low noise similarly to FIG. 9.

Besides, in the formation of the FeC film, although cosputtering using the different targets of Fe and C was carried out, it may be carried out using one FeC target. However, in the case where the FeC target is mounted in the rotation cathode type sputtering apparatus and the FeC film is formed, it takes about 12 minutes to form the FeC film having a thickness of about 200 nm.

On the other hand, in the cosputtering using the separate targets of Fe and C, the FeC film having the same thickness can be formed in about 5 minutes, and in the point of shortening of a manufacturing time, it is more advantageous to use the separate targets than to use the FeC target.

In the cosputtering of a three-target structure using two Fe targets and one C target, the FeC film of about 200 nm can be formed in about 2 minutes. Accordingly, for the purpose of shortening the time of formation of the FeC film, the cosputtering of the three-target structure may be adopted.

[4] Change of Magnetic Properties of the Backing Layer

Next, a description will be given of the change of magnetic properties in the case where one of electric power inputs of Fe and C is changed in the formation of the FeC film.

First, a description will be given of the saturation magnetization Ms and the medium noise Nm in the case where the electric power input of the Fe target is made a constant value Pwf=800 W, and the electric power input of the C target is changed.

FIG. 10 shows the content (content), saturation magnetization Ms, and medium noise Nm in the case where the electric power input Pwc of the C target is changed from 200 W to 1600 W. The electric power input Pwf of Fe was made constant to be 800 W.

Besides, the sputtering gas pressure was made 0.5 Pa, and the thickness of the FeC film was made 150 nm. At this time, the lamination amount of Fe per lamination period was 2.97 Å (constant), and the lamination amount of C per lamination period was changed from 0.10 Å to 0.84 Å.

According to the medium noise Nm of FIG. 10, in the case where the electric power input of C is made 800 W or higher, the noise is 10 $\mu$Vms or less, and it is understood that the medium noise can be made considerably lower than the conventional backing layer shown in FIG. 9.

On the other hand, according to the saturation magnetization Ms of FIG. 10, it is understood that as the electric power input of C is raised and the content of Fe is decreased, the saturation magnetization is decreased. Especially, in the case where the electric power input of C is made 1400 W or higher, the saturation magnetization becomes less than 1000 emu/cc, and it becomes insufficient to perform the function of the backing layer.

Then, in the case of this embodiment, in order that the electric power input of C is made a value in the range from about 1000 W to 1200 W, and the lamination amount per lamination period of C is made a value in the range from about 0.5 to 0.7 Å while the lamination amount per lamination period of Fe is about 2.97 Å, in other words, as compared with the related art, in order to keep a high saturation magnetization and to realize a low medium noise, it is preferable that the content of Fe is made a value in the range from about 70 at % to 50 at %.

Next, a description will be given of the saturation magnetization Ms and the medium noise Nm in the case where the electric power input of the C target is made a constant value Pwc=100 W, and the electric power input of the Fe target is changed.

Figure 11:
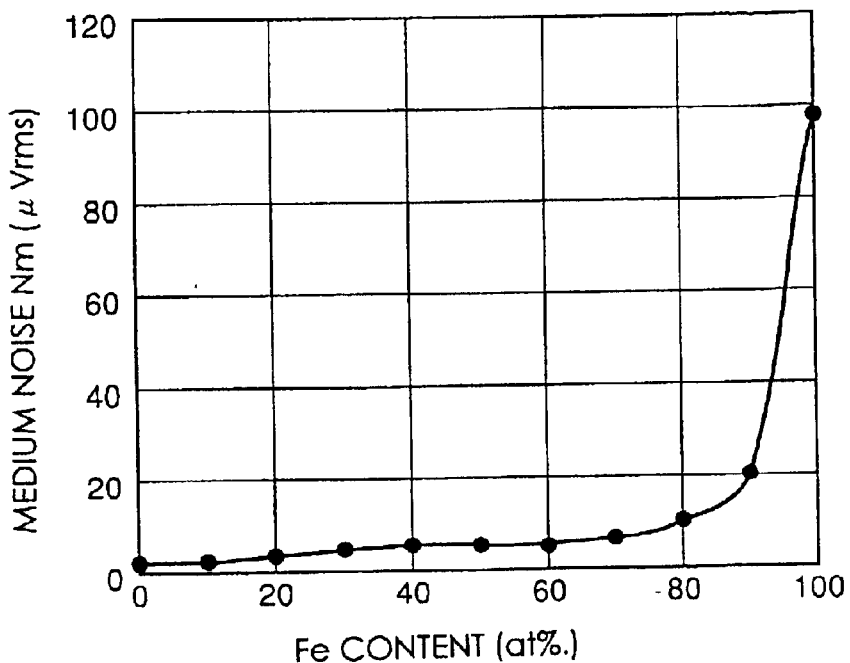
FIG. 11 is a relational graph of an Fe content and a medium noise in an example of the invention.
Figure 12:
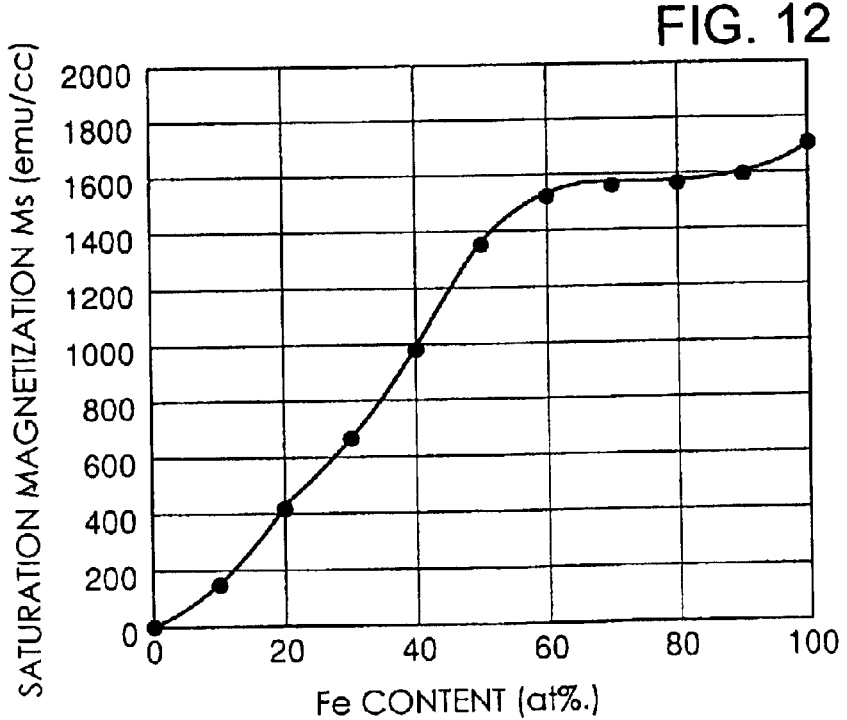
FIG. 12 is a relational graph of an Fe content and a saturation magnetization in an example of the invention.

FIG. 11 is a relational graph of the Fe content and the medium noise Nm in the case where the electric power input of Fe is changed. FIG. 12 shows the relation of the Fe content and the saturation magnetization Ms in the case where the electric power input of Fe is changed. Here, the electric power input Pwf of the Fe target was changed from 50 W to 1200 W. Besides, the sputtering gas pressure was made 0.5 Pa, and the thickness of the FeC film was made 150 nm.

According to FIG. 11, when the electric power input of Fe becomes 1000 W or higher, the content of Fe becomes 90 at % or higher, and the medium noise also becomes 20 μVrms or higher. Accordingly, in order to realize a low medium noise, it is appropriate that the electric power input of Fe is made 100 W or lower, and the Fe content is made 90 at % or lower.

On the other hand, according to FIG. 12, when the electric power input of Fe becomes 500 W or higher, and the Fe content becomes 60 at % or higher, the saturation magnetization Ms is as high as about 1500 emu/cc or higher, and when the electric power input of Fe is 400 W or less, and the Fe content becomes 40 at % or less, the saturation magnetization Ms becomes lower than 1000 emu/cc. Accordingly, for the purpose of keeping the high saturation magnetization, it is preferable that at least the electric power input of Fe is 450 W or higher, and the Fe content is made about 50 at % or higher.

Then, in the case of this embodiment, it is preferable that the electric power input of Fe is made a value in the range from about 450 W to 1000 W, and the content of Fe is made a value in the range from about 50 at % to 90 at %.

In the above, although the example in which either one of the electric power inputs of the Fe and C targets is changed has been described, the high saturation magnetization Ms of the backing layer and the low medium noise can also be realized by adjustment of the rotational speed of the substrate or adjustment of the ratio of the electric power input of the Fe target to that of the C target.

[5] Film Thickness of the Nonmagnetic Intermediate Layer

As described below, when the thickness of the nonmagnetic intermediate layer 3 is adjusted, the medium noise can be made low.

After the FeC film was formed on the substrate under the conditions of thickness of 150 nm, Fe content=80 at %, Fe electric power input=800 W, and C electric power input= 1000 W, the NiP film as the nonmagnetic intermediate layer 3 was formed thereon while the thickness was changed from 0 to 100 nm.

Figure 13:
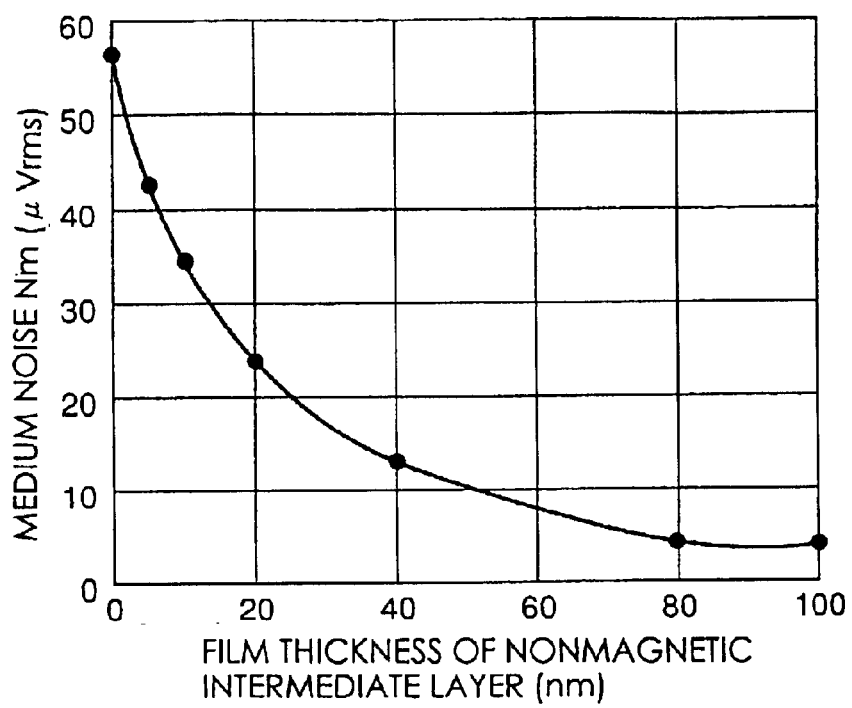
FIG. 13 is a relational graph of a film thickness of a nonmagnetic intermediate layer and a medium noise in an example of the invention.

FIG. 13 is a relational graph of the thickness of the nonmagnetic intermediate layer 3 at this time and the medium noise Nm.

According to FIG. 13, when the nonmagnetic intermediate layer 3 does not exist, a considerably large medium noise (56 μVrms) is produced. However, as the thickness of the nonmagnetic intermediate layer 3 becomes large, the medium noise is decreased, and when the thickness exceeds 50 nm, the medium noise Nm becomes 10 μVrms or less.

Besides, when the thickness of layer 3 exceeds 100 nm, the medium noise becomes almost constant (5 μVrms), and when the thickness is made larger than this, the function of the backing layer 2 is affected, and it is not preferable in the recording efficiency.

Accordingly, although it is preferable to provide the nonmagnetic intermediate layer 3 on the backing layer 2, in view of reduction of the medium noise, it is preferable that the thickness is made about 50 nm or higher and about 80 nm or lower. $SiO_2$ or Si can be used for the nonmagnetic intermediate layer 3, and also in these cases, it was possible to confirm a tendency similar to that shown in FIG. 13.

[6] Addition of Reactive Gas

In order to reduce the medium noise, in the formation process of the backing layer 2, $N_2$ as a reactive gas may be added to Ar as a sputtering gas.

Figure 14:
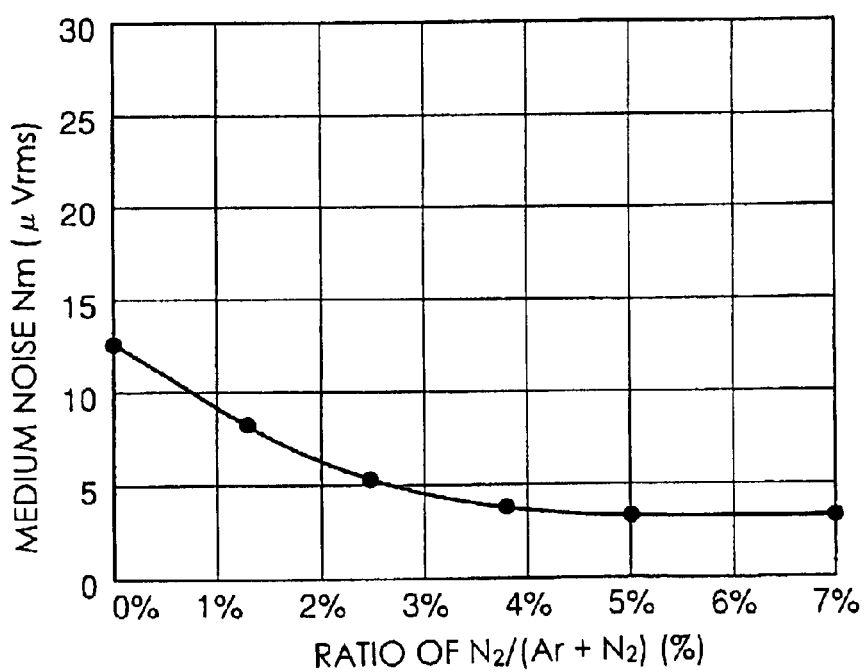
FIG. 14 is a relational graph of an addition ratio of $N_2$ gas and a medium noise in an example of the invention.
Figure 15:
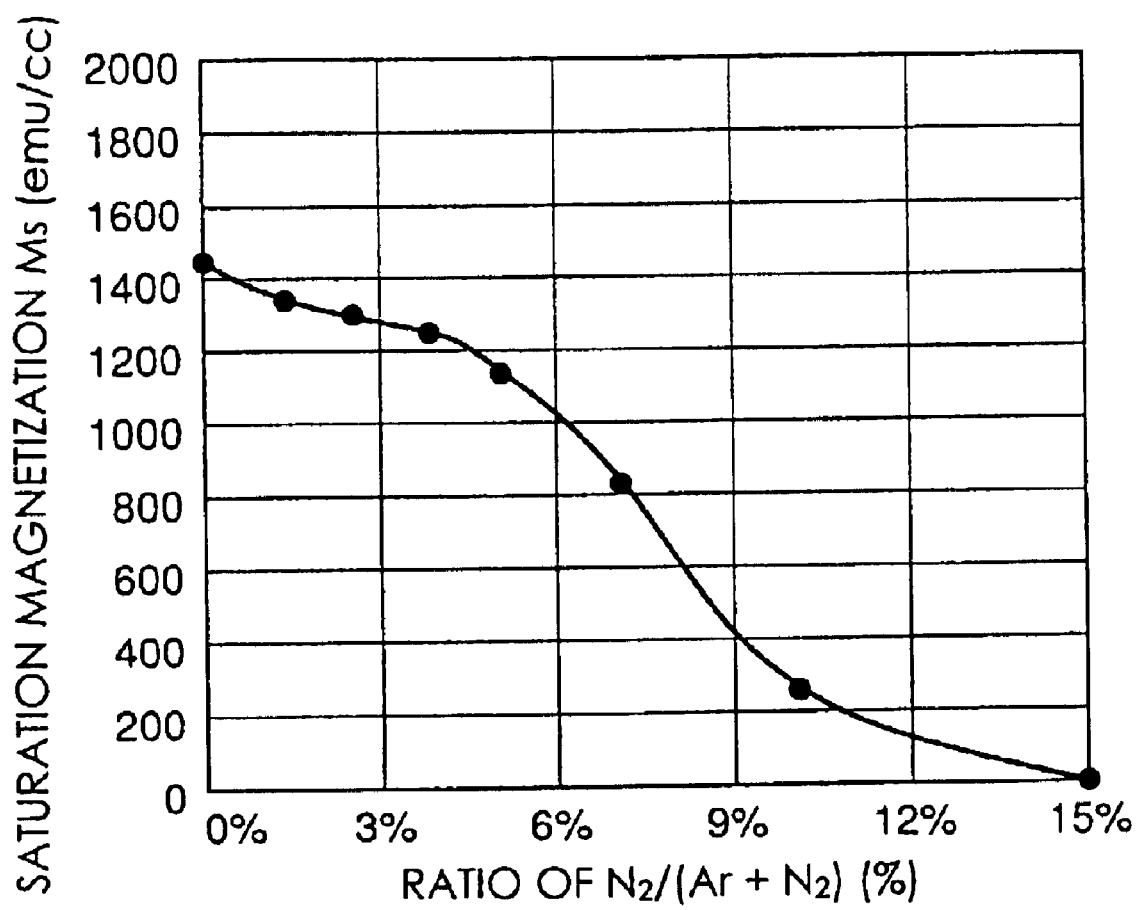
FIG. 15 is a relational graph between an addition ratio of $N_2$ gas and a saturation magnetization in an example of the invention.

FIG. 14 shows a relational graph of an addition ratio of $N_2$ and a medium noise Nm, and FIG. 15 shows a relational graph of an addition ratio of $N_2$ and a saturation magnetization Ms. The horizontal axis of the drawing indicates the flow ratio ($N_2/(Ar+N_2)$) % of $N_2$ gas to the total flow of Ar gas and $N_2$ gas.

Here, the FeC film as the backing layer 2 was formed using the self-revolving type sputtering apparatus, at room temperature (30° C.), without applying an external magnetic field, and under the conditions of Fe electric power input of 600 W and C electric power input of 800 W, and the FeC film was formed while the flow ratio of the $N_2$ gas was changed from 0% to 15%.

According to FIG. 14, it is understood that as the addition amount of the $N_2$ gas is increased, the medium noise is decreased, and even if the $N_2$ gas of 5% or higher was added, the medium noise did not become 3 μVrms or less.

Accordingly, by adding the $N_2$ gas of from 1% to 7% to the sputtering gas, the medium noise can be reduced. It is conceivable that this is obtained because the anisotropy in the radius direction is increased by the addition of the $N_2$ gas.

On the other hand, according to FIG. 15, as the added $N_2$ gas is increased, the saturation magnetization Ms is decreased, and when the addition amount of $N_2$ exceeds 6%, it becomes lower than 1000 emu/cc.

Further, when the addition amount of the $N_2$ gas is 15%, the saturation magnetization Ms becomes almost zero, and the film is nonmagnetized. Accordingly, in order to have the magnetic properties suitable as the backing layer, it is not desirable to add an excessive $N_2$ gas, and in order to have a high saturation magnetization Ms of 1000 emu/cc or higher, it can be said that the range from 0% to 6% is suitable for the addition amount of $N_2$.

From the above, in order to realize the high saturation magnetization and the low medium noise, as the sputtering gas, it is preferable to add the $N_2$ gas having a flow ratio of from about 1% to 6%. The reduction effect of the medium noise by the addition of $N_2$ is similarly obtained also in the case where a rotation cathode type sputtering apparatus is used.

According to the magnetic information recording medium of the invention, since the backing layer having the substantially amorphous structure, especially the backing layer made of the FeC film is formed on the substrate, the medium noise can be reduced while the in-plane magnetic anisotropy and high saturation magnetization sufficient for the backing layer are kept. Besides, since the backing layer is formed at room temperature and without applying an external magnetic field, the adjustment of formation conditions can be easily made.

What is claimed is:

1. A magnetic information recording medium comprising:
   a backing layer containing Fe and C as its main ingredients, having a substantially amorphous structure, and having an easy axis of magnetization in an in-plane direction; and
   a magnetic layer having an easy axis of magnetization in a vertical direction and recording information,
   wherein a value of saturation magnetization of the backing layer is 1200 emu/cc or higher, and an anisotropy magnetic field is higher than 15 Oe.

2. A magnetic information recording medium according to claim 1, further comprising a nonmagnetic intermediate layer between the backing layer and the magnetic layer.

3. A magnetic information recording medium according to claim 1, wherein an Fe content ratio of the backing layer is 90 at % or less and 50 at % or higher.

4. A magnetic information recording medium according to any one of claims 2, 1 and 3, wherein the backing layer is formed by using an Fe target and a C target, and by carrying out cosputtering at room temperature, in a state where an external magnetic field is not applied, and in an atmosphere of a predetermined sputtering gas.

* * * * *